Dec. 4, 1928.

J. C. SHAW ET AL 1,694,022

TRACER POINT

Filed April 12, 1927

INVENTORS,
John C. Shaw and
Robert D. Shaw
BY
M. H. Lockwood
ATTORNEYS.

Patented Dec. 4, 1928.

1,694,022

UNITED STATES PATENT OFFICE.

JOHN C. SHAW AND ROBERT D. SHAW, OF BROOKLYN, NEW YORK, ASSIGNORS TO KELLER MECHANICAL ENGINEERING CORPORATION, OF BROOKLYN, NEW YORK, A CORPORATION OF NEW YORK.

TRACER POINT.

Application filed April 12, 1927. Serial No. 183,150.

This invention relates more particularly to what we prefer to call a zero tracer, that is, a tracer point having zero dimensions, in that the edge of the tracer point is so arranged that it is coincident with the axis of the tracer spindle.

In using various types of machine tools adapted for electric tracer control, it has been found desirable, at times, to have a tracer point of zero value, that is, capable of following the edge of a template or pattern on the exact central or axial line of the tracer. This has been found particularly desirable in tracers for use in connection with the cutting of cams on the type of cam cutting machine described in our pending application, Ser. No. 71,926, filed November 27, 1925.

Obviously our zero tracer point, under certain conditions, may be adapted for similar cooperative use in connection with other types of tracers, and such adaptation is contemplated whenever found desirable.

Figure 1:
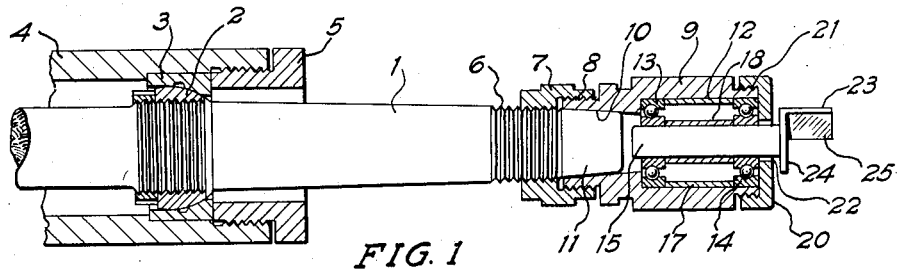
Figure 2:
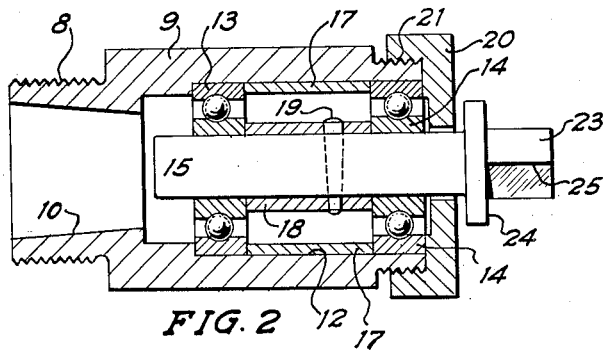
Figure 5:
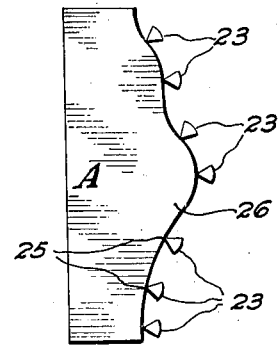
Figures 3, 4:
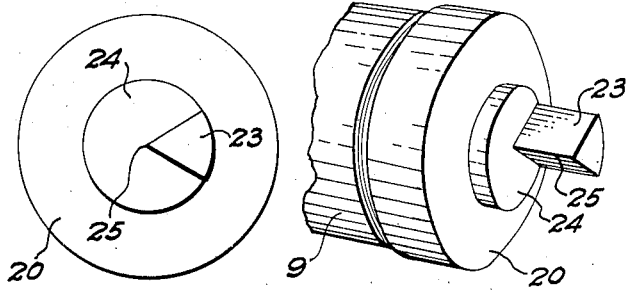
Figure 6:
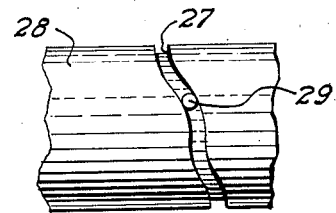

Therefore, the object of the zero tracer point is to accomplish the above result and, for the purpose of illustration, one form of our improved tracer is more particularly shown in the accompanying drawings, in which Fig. 1 shows a broken away sectional outer end portion of a standard electric tracer, the end of the spindle being provided with our improved tracer point, the mounting of which is shown in section; Fig. 2 is an enlarged sectional view of the tracer point head; Fig. 3 is a perspective view of the tracer point; Fig. 4 is an end view of the head and tracer point; Fig. 5 represents a pattern or template, one edge of which is cut to conform to the development of a barrel cam such as may illustrate the use of the zero tracer, and the tracer point is represented at various positions along the edge of the cam development; Fig. 6 represents a barrel cam, such as might be cut from the development shown in Fig. 5.

While the zero tracer point may be used in cooperation with any suitable tracer spindle and support, in the present instance, it will be understood that it is preferably adapted to be secured to the spindle of either the standard electric tracer or the contouring tracer, substantially as shown and described in the application of John C. Shaw, Ser. No. 696,827, for electrical operation and control of machine tools, filed March 4, 1924. In both the standard and the contouring tracer, the spindle 1 is mounted for universal lateral movement, and this is preferably obtained by the hemispherical ball bearing 2 mounted on the spindle 1, and supported in the ball socket 3. The ball socket 3 is secured in the outer end of the casing barrel 4, by means of a threaded thimble 5, substantially as shown in Fig. 1.

The outer end of the spindle 1 is threaded at 6 and carries a clamping nut 7, which is adapted to cooperate with the threaded end 8 of a tracer point supporting member or head 9, which has a cone socket at 10 for cooperation with the cone end 11 of the spindle. From this arrangement, it will be seen that by turning the nut 7, the head or member 9 may be securely clamped to the end of the spindle 1.

In the present form of our improvement, as shown in Figs. 1 and 2, the member 9 is barrel-shaped and bored at 12, and within and at each end of this bore, ball bearings 13 and 14 are mounted, for rotatably supporting a centrally located stud shaft 15. Annular spacing collars 17 and 18 are preferably provided for positioning the respective ball bearing rings 13 and 14, but obviously any suitable means may be employed. The spacing collar 18 is preferably secured to the stud shaft 15 by the pin 19. The outer end of the cylindrical head 9 is shown as closed by a cap 20, which is screw-threaded on to the barrel at 21.

The stud shaft 15 projects through a central opening 22 in the cap and is provided at its outer end with the tracer point 23. The tracer point 23 preferably comprises the segment of a cylinder, projecting from a flange disc 24, formed by cutting away approximately 290° of the cylinder. The cuts in producing the tracer point 23 being made on radial planes, a knife-edge is formed at 25. The knife-edge 25 is, therefore, coincident with the axis of the shaft 15, and the latter, with its ball bearings, forms a rotatable support for the tracer point 23, thereby providing a zero tracer, that is, a tracer of zero dimensions such that the point or edge in following a pattern or template is always coincident with the axis of the tracer spindle. By mounting the supporting shaft 15 on ball bearings, as described, the tracer point 23, being readily rotatable about an axis coincident with that of the tracer spindle, is rotatable about the knife edge 25 following the template.

In order to show the operation, Fig. 5 illustrates a template A, the edge 26 of which represents the development of a cam, along the central line of the cam track, and from which the barrel cam may be cut as a groove 27, as indicated in Fig. 6. At various points along the contour edge 26 of the template, the knife edge tracer 23 is represented with a central line through the knife edge 25, substantially perpendicular to the edge being followed. Thus, with this arrangement, a tracer of zero dimensions is provided and may be utilized to follow any given contour. As previously pointed out, this is of particular importance in cutting cams, for in laying out developments of the cams on the plates A, it is desirable that they should be laid out to represent the path of the axis of the cam follower or roller, represented at 29.

In the operation of the zero tracer, it will be understood that, since the tracer may be considered as of zero dimensions, the exact central line of a given cam groove can be laid out and followed, and if the cutter used is of a diameter corresponding substantially with the diameter of the follower roller, an accurate cam groove will be cut.

From the foregoing, it is believed that the operation of our improved zero tracer will be readily understood, and it has been found in actual practice that the device is particularly useful in operating on templates for cutting cams, as previously indicated.

It will be understood that while we have shown the preferred form of our improvement, we do not wish to be limited to the specific details shown and described, for various modifications therein may be made without departing from the spirit and scope of the invention.

We claim:—

1. A tracer provided with a wobbling spindle, a tracer point adapted to be detachably secured to the end of said spindle, provided with a knife edge, and means mounted on the spindle for supporting said tracer point for rotation on an axis coincident with said knife edge and with the axis of said spindle.

2. A tracer provided with a wobbling spindle, a tracer point adapted to be detachably secured to said spindle for controlling the operation of machine tools, comprising a head, means for securing the head to said spindle coaxially therewith, a tracer point carried by said head and provided with a knife edge coincident with the axis thereof and of said spindle and bearings permitting rotative movement of said tracer point about said axis.

3. A tracer for controlling the operation of machine tools, comprising a spindle, means for supporting said spindle for universal wobbling movement, a tracer point mounted on said spindle, said tracer point having a knife edge coincident with the axis of said spindle, and means attached to said spindle providing a rotatable support for said tracer point, whereby it is adapted for rotation about said knife edge axially of said spindle.

4. A tracer for controlling the operation of machine tools, comprising a spindle having universal lateral movement, a tracer point, a head adapted to be removably attached to the end of said spindle with its axis coincident therewith, bearings mounted in said head for rotatably supporting said tracer point, said tracer point being provided with a knife edge coincident with the axis of said head for cooperation with the pattern.

JOHN C. SHAW.
ROBERT D. SHAW.